United States Patent [19]

Clarkin

[11] Patent Number: 5,069,881

[45] Date of Patent: Dec. 3, 1991

[54] DEVICE AND METHOD FOR APPLYING ADHESIVES

[75] Inventor: William J. Clarkin, Hickory, Pa.

[73] Assignee: Mobay Corporation, Pittsburgh, Pa.

[21] Appl. No.: 550,408

[22] Filed: Jul. 10, 1990

[51] Int. Cl.5 .................. B01J 19/26; B01F 15/02
[52] U.S. Cl. ................................ 422/135; 222/424; 239/432; 264/328.6; 264/349; 366/159; 366/336; 425/543
[58] Field of Search .................. 264/240, 349, 259, 75, 264/328.6; 425/543, 132, 131.1, 375, 380, 376.1, 190, 206, 130, 447, 197; 239/418, 432, 433; 422/133, 135; 222/135, 424; 366/96, 159, 336

[56] References Cited

U.S. PATENT DOCUMENTS

| | | | |
|---|---|---|---|
| 1,083,275 | 1/1914 | Eberhard | 264/75 |
| 2,431,349 | 11/1947 | Stacy | 425/130 |
| 2,957,203 | 10/1960 | Marshall, III | 264/349 |
| 3,605,183 | 9/1971 | Heckrotte | 425/447 |
| 3,696,840 | 10/1972 | Odhner | 425/543 |
| 3,752,623 | 8/1973 | Sinn et al. | 425/206 |
| 4,129,636 | 12/1978 | Boden et al. | 264/51 |
| 4,224,266 | 9/1980 | Hunt et al. | 425/131.1 |
| 4,313,909 | 2/1982 | Boden et al. | 422/133 |
| 4,370,062 | 1/1983 | Moody | 239/432 |
| 4,378,335 | 3/1983 | Boden et al. | 422/133 |
| 4,603,813 | 8/1986 | Luegering | 239/432 |
| 4,815,660 | 3/1989 | Boger | 239/418 |

FOREIGN PATENT DOCUMENTS

| | | | |
|---|---|---|---|
| 2143620 | 2/1973 | France | 264/349 |
| 63-21109 | 1/1988 | Japan | 264/240 |

Primary Examiner—Jeffery Thurlow
Assistant Examiner—Mathieu Vargot
Attorney, Agent, or Firm—Joseph C. Gil

[57] ABSTRACT

The invention is directed to a device and a method for the application of any adhesive. The device include a hydraulically actuated mixhead which contains means to controllably deliver the components of a polyurethane based adhesive to the point of application of the adhesive and the means to separate between the components until the reaction between them is desired. Typically the components are in the form of streams and comprise an isocyanate stream and a polyol stream, the volume and flow velocity of each of which are in accordance within the invention hydraulically controlled.

1 Claim, 2 Drawing Sheets

DEVICE AND METHOD FOR APPLYING ADHESIVES

The present invention relates to adhesives and more particularly to a device and method for applying a two-component adhesive.

SUMMARY OF THE INVENTION

The invention is directed to a device useful for the application of an adhesive. The device comprise a hydraulically actuated mixhead which contains means to controllably deliver the components of a polyurethane based adhesive to the point of application of the adhesive and the means to separate between the components until the reaction between them is intended. Typically the components are the form of streams and comprise an isocyanate stream and a polyol stream, the volume and flow velocity of each of which are in accordance with the invention hydraulically controlled.

BACKGROUND OF THE INVENTION

Pneumatically controlled streams of chemicals are commonly used in the chemical industry, typically in the manufacture of polyurethane foams and the like. U.S. Pat. No. 4,129,636 is noted to disclose a process and an apparatus for filling a mold cavity with foamable reaction mixture of chemical components. The associated piston is said to be driven pneumatically, hydraulically, mechanically or electromagnetically. In U.S. Pat. No. 4,313,909 there is disclosed a method and an apparatus for the production of a reaction mixture for forming solid substances from flowable reactants. A device for producing a solid-forming or foaming flowable reaction mixture is disclosed in U.S. Pat. No. 4,378,335. An attempt to use an air actuated mixhead in an adhesive application where the streams of the reactive components were introduced into a static mixer failed.

The present invention which comprise a hydraulically actuated mixhead overcomes the above mentioned disadvantages. The mixhead includes the means to control the recirculation, and thus the temperature of the components, and the velocity of each of the streams to achieve accurate stop-start cycles. The design of the dividing joint assures the separation of the individual streams up to the point of their introduction into the reaction zone of a static mixer.

DETAILED DESCRIPTION OF THE INVENTION

The invention is directed to a device for the dispensing of controlled amounts of reactive components of a polyurethane based adhesive. An additional embodiment of the invention is directed to a method for the application of a polyurethane adhesive which is prepared from reactive components by using the device of the invention.

The purpose of the invention is to enable the introduction of two streams of reactive chemicals at a controlled rate, volume, velocity and temperature into a static mixer. A "static mixer" is an art recognized term for a no-moving-parts mixer. See, for instance, "static mixer design moves ahead with new technique," Process Engineering, June 1980. The invention enables control of the chemical reaction between two highly reactive components which may differ from each other in terms of their respective viscosities and provides for the deposition of a uniform stream of the thus reacting material on a surface. The invention is particularly useful in the application of polyurethane based adhesives.

In accordance with the invention, the hydraulically actuated mixhead comprise two nozzles each of which deliver one of the components of the adhesive. The nozzles are arranged such that the emerging streams do not impinge one on the other. The dispensing and recirculation of the individual streams through their respective nozzles is hydraulically actuated. This enables continuous control of the temperature and thus the viscosity of each of the components during the no-shot time periods, and for controlling the volume and velocity of the material during the shots. The flow of the materials through the nozzles is adjustable to provide control over a wide range of viscosities and to eliminate lead-lag conditions in intermittent shot cycle.

The nozzles are positioned such that the individual components are not brought into contact one with the other at any point before they are individually introduced to the reaction zone of a static mixer. Preferably, the reaction zone begins at the second element of the static mixer. Preferably, the nozzles are positioned so that they form a relatively acute angle therebetween. The arrangement also permits carrying out simultaneous calibration shots to be made without mixing the chemicals.

The velocity of each component through the nozzle is controlled to make certain that the individual streams meet in the first, preferably the second, element of the static mixer and to assure thorough mixing by the static mixer. The arrangement permits a continuous or intermittent stream of reacted material of controlled volume, viscosity and velocity to be deposited on a surface.

A critical feature of the inventive device is the dividing joint which is positioned between the individual nozzles on the one hand and the static mixer on the other. The joint which is depicted in cross section in FIG. 2, has a "bow tie" cross section. The joint functions as a divider separating between premature interaction.

Figure 1:
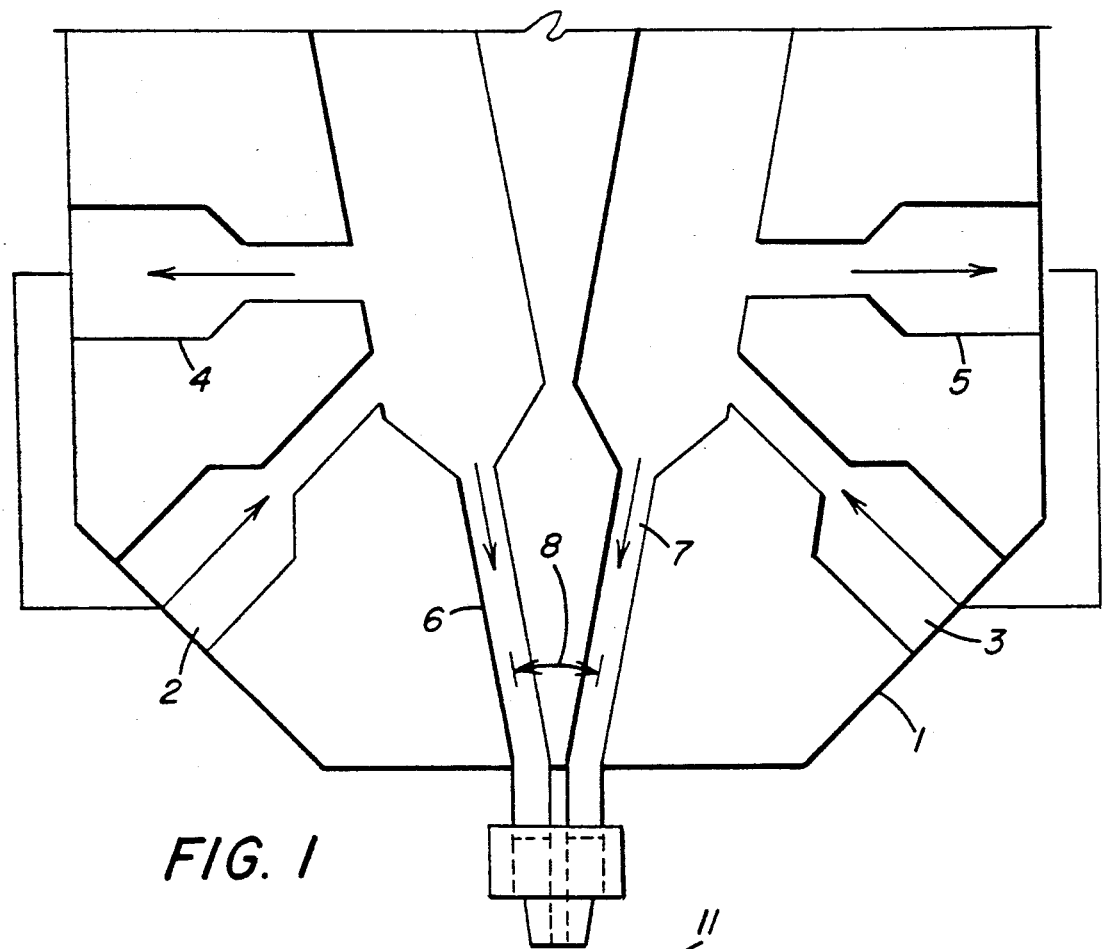
FIG. 1 shows an inside view of the mixhead of the invention including the preferred arrangement of the nozzles.

The mixhead of the invention, 1, comprise feed pipes, 2 and 3, leading from storage tanks (not shown) through metering pumps (not shown) to injection nozzles, 6 and 7, respectively which merge into a static mixer (not shown). Recirculation of the components is provided by conduits, 4 and 5. While each of these elements are known in the art, the features characterizing the present device include first, the separation between the injection nozzles, represented by the acute angle, 8, formed between the injection nozzles, and second the dividing joint (not shown in FIG. 1). The separating arrangement of the nozzles and the configuration of the dividing joint, prevent the reaction between the components at any time prior to their introduction individually into the reaction zone of the static mixer.

Figure 3:
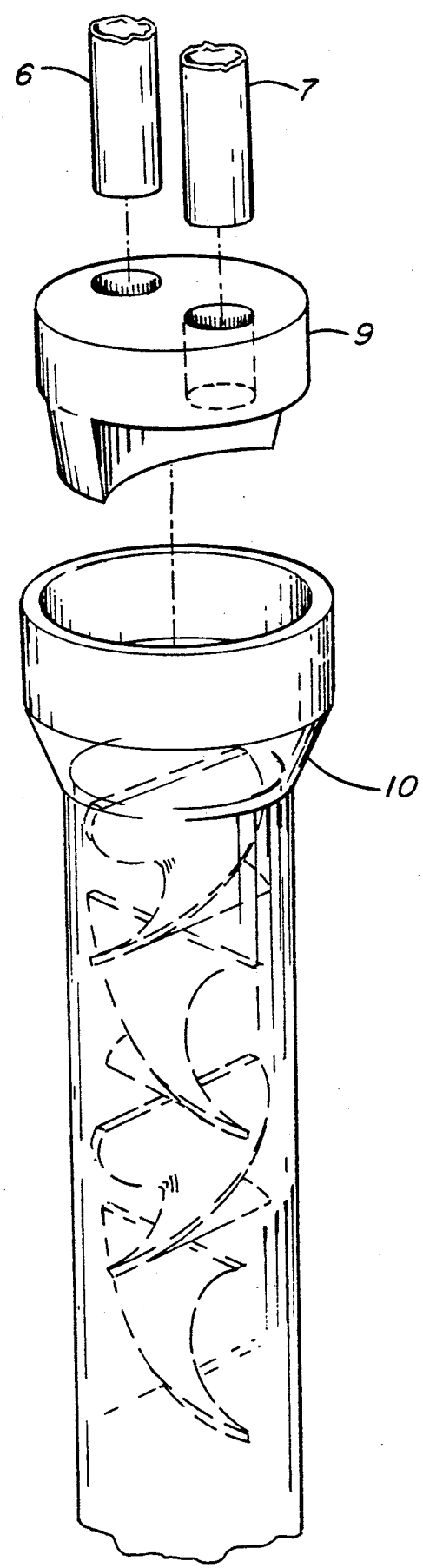
FIG. 3 shows the arrangement of the mixhead, the dividing the static mixer.

The dividing joint 9, in FIG. 3 ensures separation between the materials and prevents a reaction therebetween at any point before they have been introduced into the reaction zone of the static mixer.

Figure 2:
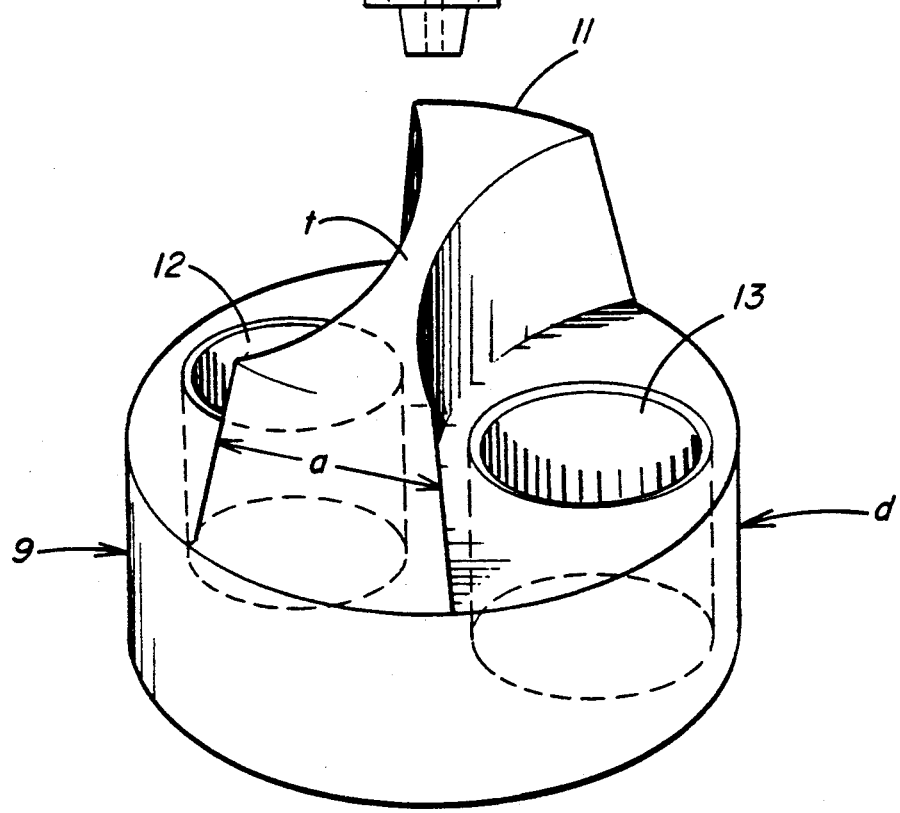
FIG. 2 shows the cross section of the dividing joint.

The cross section of the dividing joint as shown in FIG. 2 entails a separator having a "bow-tie" shape, 11, to divide between the streams of the components emerging from outlets, 12 and 13. The dividing joint features several critical dimensions including the minimum separation, t, the diameter of the joint, d, and the maximum separation, a. Preferably, the dividing joint of the invention is tapered to enable a tight fit into the static mixer. The table below provides a guideline for selecting the proper dimensions for a dividing joint. (The dimensions are given in inches).

| Example | 1 | 2 | 3 |
|---|---|---|---|
| a | 0.180 | 0.310 | 0.410 |
| t | 0.060 | 0.060 | 0.060 |
| d | 0.553 | 0.678 | 0.803 |

A divider conforming to Example 2 above was fabricated and used successfully in accordance with the invention.

FIG. 3 shows the arrangement of the components of the device of the invention which includes the nozzles, 6 and 7, the dividing joint, 9, and the static mixer, 10.

Modifications and variations of the invention thus described are of course possible in light of the above teaching. It is, however, understood that such changes are within the full intended scope of the invention as defined by the appended claims.

What is claimed is:

1. A device for applying a polyurethane adhesive to a surface comprising:
   (j) a mixhead comprising
      (1) hydraulically actuated means for controlling recirculation of a polyol component and an isocyanate component within said mixhead,
      (2) a hydraulically actuated nozzle for controlling the flow of said polyol component from said mixhead,
      (3) a hydraulically actuated nozzle for controlling the flow of said isocyanate component from said mixhead,
   (ii) a dividing joint having a separator with a bow-tie cross section, said joint having holes to receive each of said nozzle and said separator extending past outlets of said nozzles, said joint functioning to keep said polyol component and said isocyanate component from contacting each other and being positioned such that said polyol component and said isocyanate component flow into said joint from said mixhead and thereafter flow out of said joint in two separate streams, and
   (iii) a static mixer located such that said two separate streams flow into said static mixer, are mixed together therein, and thereafter flow out of said static mixer onto said surface, said joint being insertably positioned within said static mixer.

* * * * *